April 10, 1973     E. J. HARRIS     3,726,742

TIRE BUILDER

Original Filed Nov. 17, 1967     15 Sheets-Sheet 1

INVENTOR.
EDWARD J. HARRIS

ATTORNEY

April 10, 1973     E. J. HARRIS     3,726,742

TIRE BUILDER

Original Filed Nov. 17, 1967     15 Sheets-Sheet 2

INVENTOR.
EDWARD J. HARRIS

ATTORNEY

INVENTOR.
EDWARD J. HARRIS

ATTORNEY

April 10, 1973  E. J. HARRIS  3,726,742
TIRE BUILDER

Original Filed Nov. 17, 1967  15 Sheets-Sheet 4

INVENTOR.
EDWARD J. HARRIS

ATTORNEY

INVENTOR
EDWARD J. HARRIS
ATTORNEY

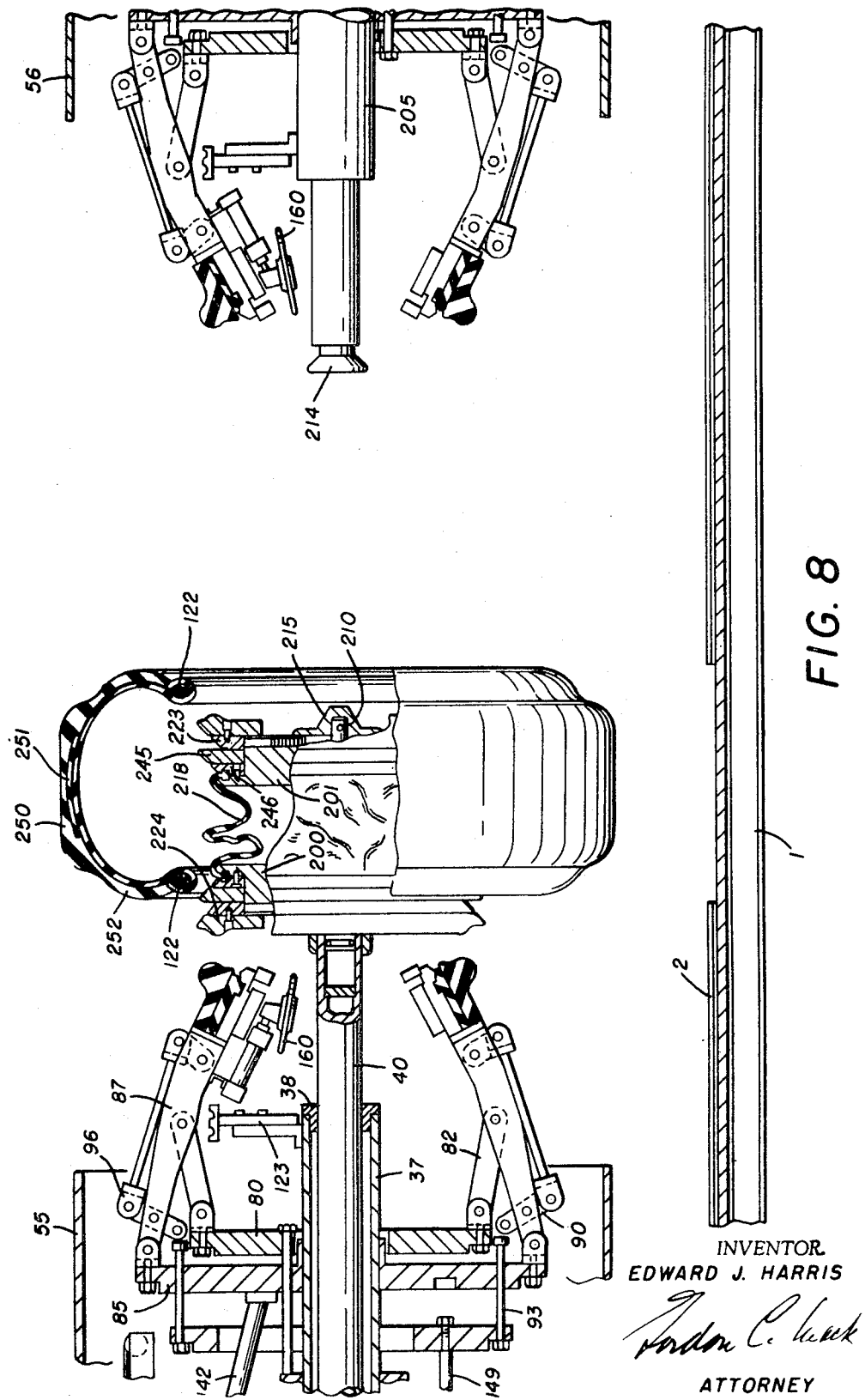

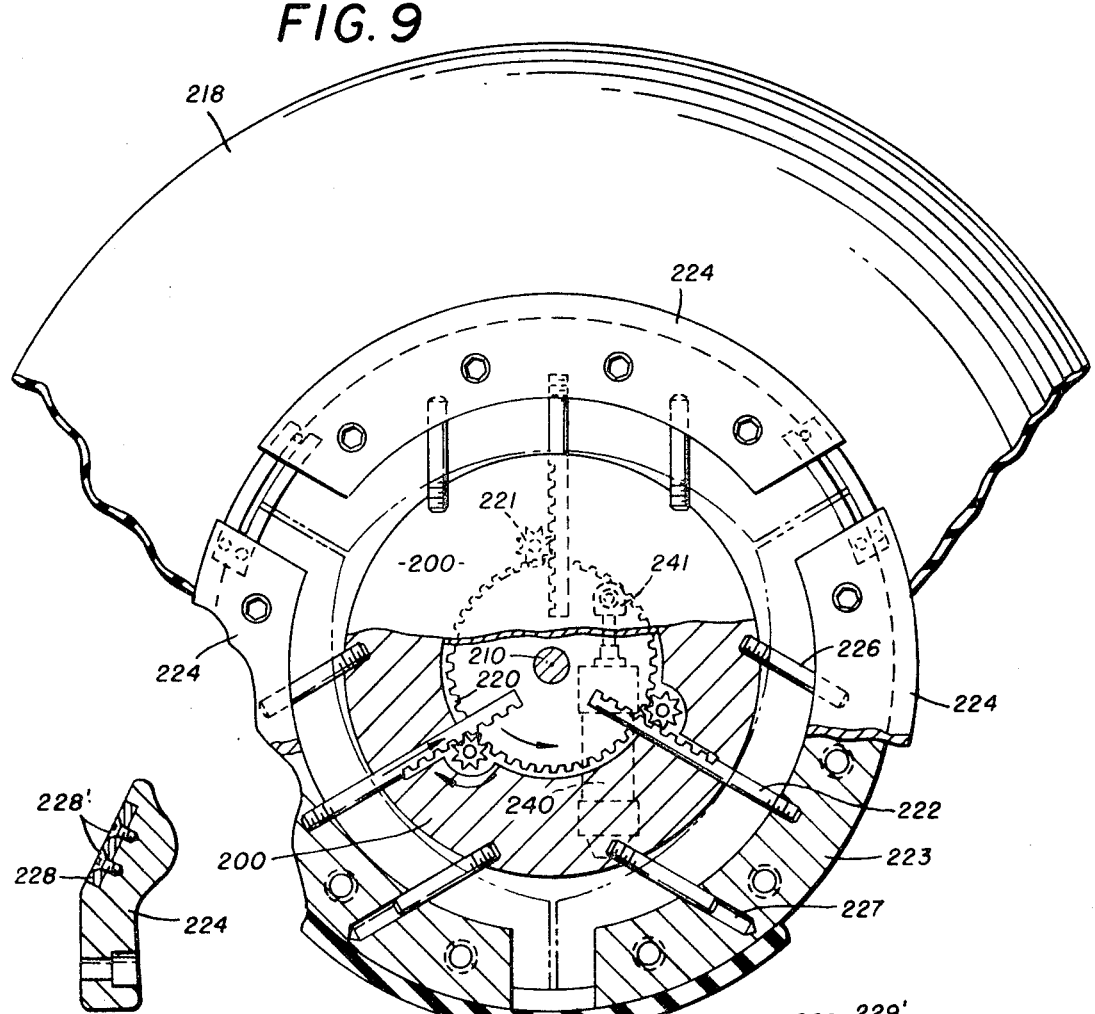
FIG. 9
FIG. 9B
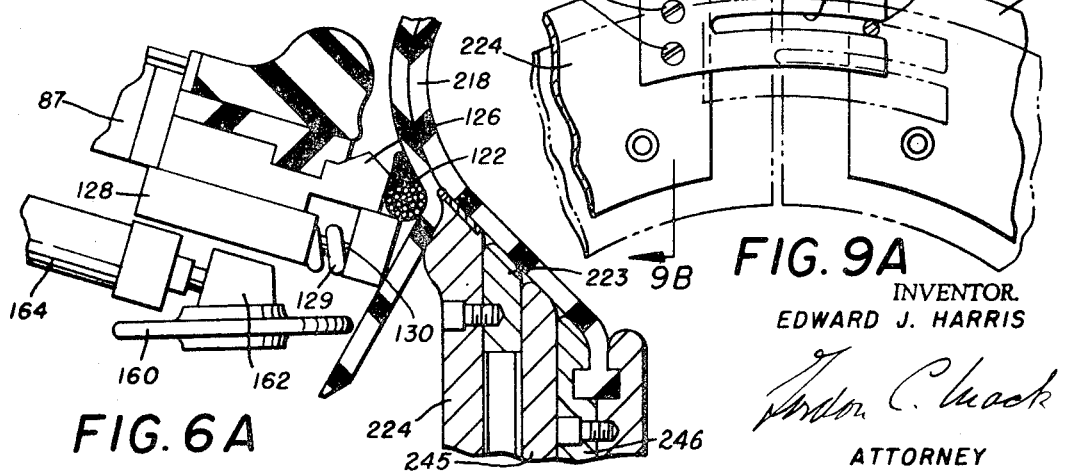
FIG. 6A
FIG. 9A
INVENTOR.
EDWARD J. HARRIS
ATTORNEY

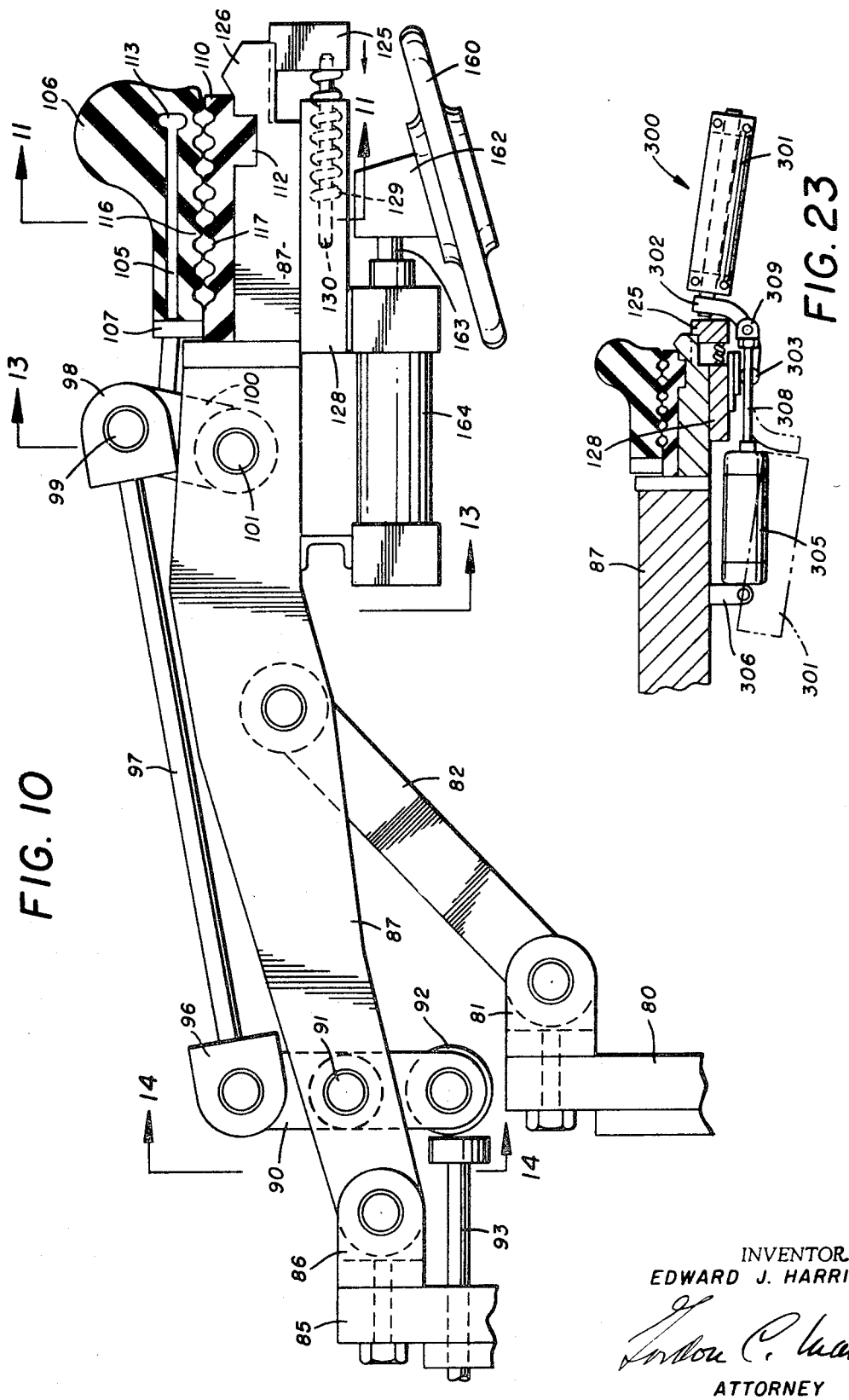

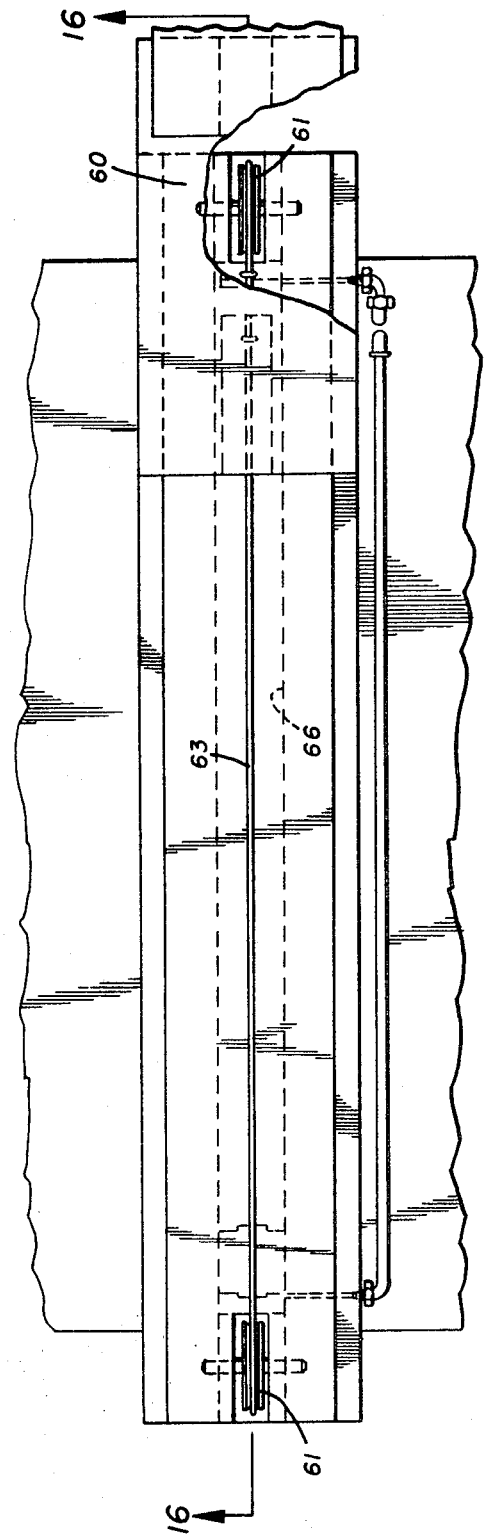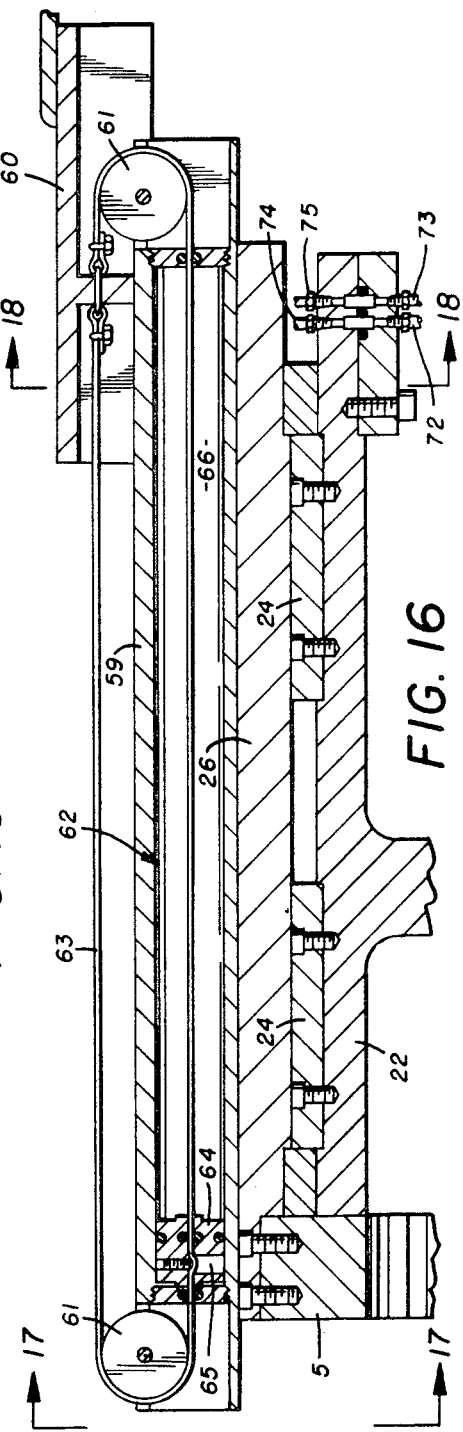

INVENTOR
EDWARD J. HARRIS
ATTORNEY

April 10, 1973  E. J. HARRIS  3,726,742
TIRE BUILDER

Original Filed Nov. 17, 1967  15 Sheets-Sheet 15

INVENTOR.
EDWARD J. HARRIS

ATTORNEY

United States Patent Office 3,726,742
Patented Apr. 10, 1973

3,726,742
TIRE BUILDER
Edward J. Harris, Akron, Ohio, assignor to
Frances Harris, Akron, Ohio
Original application Nov. 17, 1967, Ser. No. 683,881, abandoned. Divided and this application Dec. 16, 1970, Ser. No. 98,637
Int. Cl. B29h 17/10, 17/12, 17/20
U.S. Cl. 156—400                46 Claims

ABSTRACT OF THE DISCLOSURE

A tire builder which includes a flexible, inflatable bladder supported at one side only, between two separately supported drums which are movable to bring the drum parts in touching arrangement near the largest diameter of the bladder and movable away from the bladder. Non-rotatable means is provided for grasping the edges of a carcass band formed on the drum parts when touching, and shaping the edges of the band over the bladder when the drum parts are separated. Suitable for building radial tires. Means is provided for supplying a bead to each side of the carcass.

This application is a division of my application Ser. No. 683,881 filed Nov. 17, 1967, now abandoned.

This invention relates to a tire builder for assembling the component parts of a green pneumatic tire preliminary to vulcanization. It includes sub-assemblies of the tire builder and the method of building a green tire on the tire builder and the operation of sub-assemblies thereof.

The tire builder of this invention can make either radial tires or the conventional bias-angle tires. In radial tires the cords of the carcass extend almost perpendicularly to the beads, whereas the bias-angle tire cords are at an angle of usually about 37 degrees, but may be more or less. The tire builder differs from the conventional machine in various respects. An important difference is that the tires built on conventional machines are flat-built and drum-shaped and then the central portion is expanded by a bladder, usually in a tire press, to give the final green tires the required toroidal shape. Tires built on the tire builder of this invention are built as a band on a flat drum, but instead of expanding the central portion of the band by a bladder or the like, the edges of the green carcass band are decreased in diameter as the tire is shaped over a core, the beads are placed against the green shaped carcass, and the edges of the shaped carcass are turned up and/or under. The carcass plies may all be shaped over the core at the same time or in different portions. A breaker or belt is applied, if and as required, and a tread is added. Sidewalls may be separately added if desired. Such added parts may be shaped with the carcass or later.

THE PRIOR ART

The edges of the drum-shaped green carcass band are reduced in diameter by the operation of rubber belts. Prior art on the use of belts for this purpose includes Frohlich U.S. Pats. Nos. 2,503,815, 2,887,148, 2,953,186, 2,939,508 and 2,954,818. According to this prior art, the diameter of the belts is reduced and enlarged by a camming operation, whereas in the preferred operation of this invention the diameters of the belts are increased and decreased by hydraulic cylinders. The clamping of the belts, according to this invention, is accomplished by novel mechanism. It will be brought out in what follows that in the prior art to which reference has been made, the building drums, the arms holding the rubber belts, the cams and rollers which operate the same, are all tied in together and rotate as a unit, whereas in the tire builder of this invention there are no cams or rollers; some parts operate and some are stationary, and different parts operate separately from one another. Thus, only the building drums and the core or bladder over which the green carcass band is shaped, are rotated, and the mechanism which operates the belts does not rotate.

U.S. Pat. 2,910,109, issued to said Frohlich and the present inventor, is an improvement over the mechanism and operations described, and over the bladder of Frohlich Pat. 2,503,815, but even with the device shown in U.S. Pat. 2,910,109 which made an excellent toroidal tire, the bladder was mounted on a wheel and rim, and to remove the finished green tire it was necessary to remove the tire and wheel assembly from the rest of the tire builder and to manually disassemble the wheel and rim, and to remove the deflated bladder from within the green tire; and the parts had to be reassembled for building a new tire on them.

It is old in the art to build a tire on a flat drum and then convey the green carcass band to a press as disclosed in this inventor's U.S. Pat. 3,041,667, to shape the tire to a toroidal configuration by a bladder.

Although it is possible to build bias-angle tires on the tire builder of this invention, such tires after which the on the drum of prior-art equipment, after which the tread area of the green bands is increased in diameter. However, it is impossible to substantially increase the diameter of a radial tire band because it includes a belt or breaker in which the cords are substantially circumferential.

There are two ways to manufacture a radial tire: One is to build the tire on the drum of a conventional-type tire builder in which the drum is of a resilient material so that after the plies and the beads are assembled the resilient material may be expanded so that the plies assume a toroidal configuration. At this stage the belts, or breakers, as they are known, are applied to the crown section of the toroidal tire, following which the tread, usually with sidewalls attached, is applied over the breakers. Great difficulty has been encountered in manufacturing a radial tire on this type of tire-building machine because of the difficulty in assembling the breakers and tread which must be done on the toroidal configuration. Furthermore, unless this is done with precision the tire will not run true.

Another method of building radial tires has been on a two-stage basis, and that is of assembling the plies and beads on the drum of a conventional machine, then removing the assembly to a second machine with an inflatable bladder and inflating the carcass to toroidal configuration, following which the breakers and tread are applied. The latter method is, of course, slower than the single-stage method, but in both cases great difficulty has been experienced in manufacturing a radial tire, which requires much greater precision than the normal bias-angle tires. Both methods are also very time consuming.

The tire builder of this invention operates as a single-stage machine in which the breaker and tread are assembled with the plies before shaping the tire, and this is true regardless of whether the tire manufactured is a bias-angle tire or a radial tire. It is possible to manufacture radial tires in this manner because instead of enlarging the central portion of the green carcass band to obtain the toroidal shape, the diameter of the central portion is not changed but the diameters of the two edges of the green tire are reduced.

In the method of building a tire wherein the plies are assembled on a conventional flat-drum machine and then inflated to the toroidal configuration prior to application of the breakers and tread, it has been found that the spacing between the tire cords lacks uniformity due to irregular bladder expansion, so that great difficulty has been experienced in manufacturing tubeless radial tires because of this lack of uniformity. The different spacings between the cords is objectionable because the cords cannot support the tubeless liner properly and air penetrates between the irregularly spaced cords. In the process of this invention there is no expansion of a tire carcass before curing. It is shaped on a bladder and in the construction of a radial tire, the spacing of the radial reinforcing elements in the tread area remains uniform. As the ends of the continuous green-tire band are reduced in diameter the spacing of the radial reinforcing elements is decreased and the end count of these elements in said edges is increased without altering the spacing of these elements in the tread area.

THE INVENTION

The invention relates to a new tire builder and the method of making bias-angle and radial tires.

As shown in FIG. 1, the tire builder comprises a base with tracks A, which supports the mechanism. The carriages B and C comprise vertical end plates mounted on side plates, and there are rollers on the side plates supported on the tracks so that the carriages can be moved toward and away from the central portion of the tire builder. The drum assemblies comprise drums D and E rotatably mounted on supports F and G, and the supports are mounted on end plates. The drums move laterally toward and away from the end plates and toward and away from the bladder H over which the tires are shaped. The bladder is mounted on a chuck.

The tire builder includes certain units which have utility in other mechanisms, including the chuck, rotary air units, and the dove-tailed slides, all of which will be further described in what follows and, particularly, as utilized in a tire builder.

In the drawings, the left side of the tire builder is shown in detail. In general, the right side is identical. However, it will be shown that the support of the chuck is different and other differences will be mentioned.

The invention is further described in connection with the accompanying drawings, in which—

FIG. 6A is a detail of a bead setter, setting a bead;

FIG. 8 is an elevation similar to a portion of FIG. 4, with the chuck supported on one side only, by a quill and the finished tire ready for removal from the collapsed chuck and bladder;

FIG. 9 is a vertical section taken on the line 9—9 of FIG. 4;

FIG. 9A is a side detail of an improvement over the chuck shown in FIG. 9;

FIG. 9B is a section on the line 9B—9B of FIG. 9A;

FIG. 10 is an enlarged view of the shaping arm with the belts in position thereon, and the turn-up wheel and bead-setting mechanism;

FIG. 15 is a view taken on the line 15—15 of FIG. 4, partly broken away to show a detail of the building-drum support and the slide mechanism;

FIG. 16 is a section taken on the line 16—16 of FIG. 15 showing parts of the building-drum support and the slide mechanism, etc.;

Figure 21:
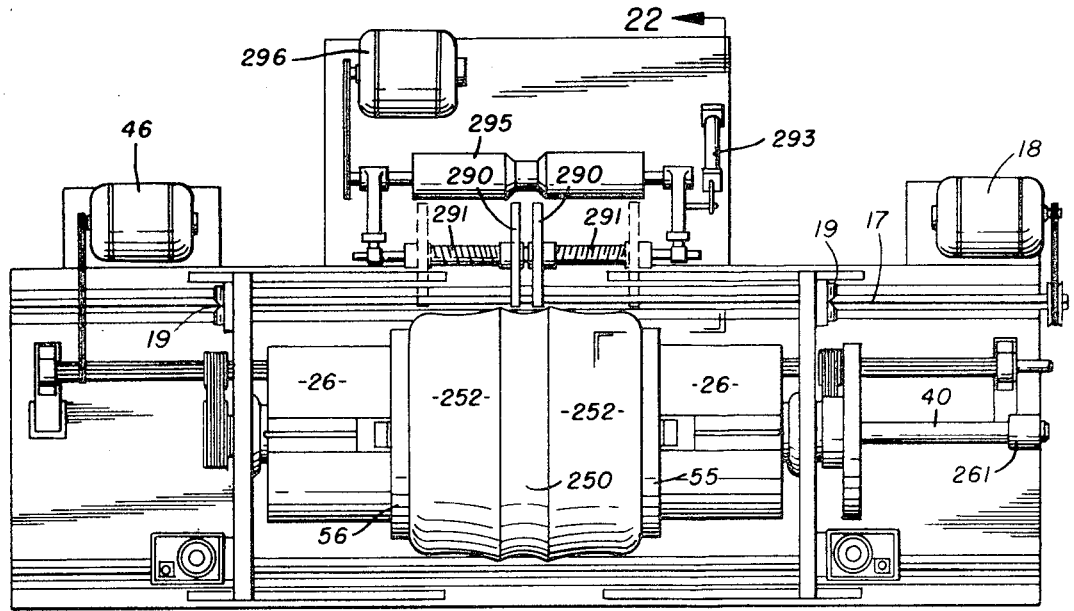
FIG. 21 is a plan view of the whole of the tire builder and stitching wheel.
Figure 22:
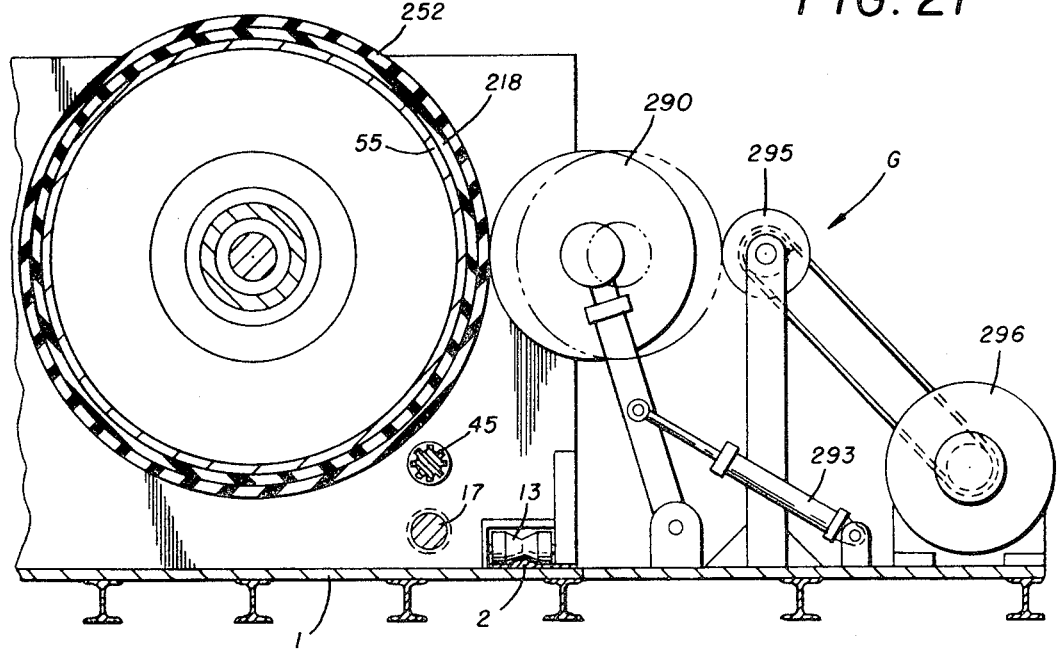

FIG. 22 is a section taken on line 22—22 of FIG. 21 showing in full lines and dot-dash lines the movement of the stitching wheel; and FIG. 23 is a modification of the arm shown in FIG. 10 which includes a roller, usually installed in the uppermost arm to be used for limp or flexible plies as well as those of great width which are not stiff enough to be self-supporting when the building drum is withdrawn.

The base A comprises a platform 1 and tracks 2 at the right end, and tracks 3 at the left end.

The carriages B and C include the left-end plate 5 and right-end plate 6, both of which are vertical and mounted on the pairs of side plates 8 and 9, the plates of each pair being mounted on opposite sides of the platform adjacent the tracks. FIG. 2 shows rollers 12 and 13 in bearings 14 (FIG. 1) mounted in boxes 15 (FIG. 2) and the rollers rest on the tracks 2, and similar rollers at the other end of the device rest on tracks 3.

The jack shaft 17, driven by the motor 18 (FIG. 21), comprises right- and left-handed screws at the ends thereof threaded into the nuts 19 in the end plates 5 and 6 so that the carriages can be moved toward and away from one another as desired.

Referring now to FIGS. 4 to 6 and 16: The casting 22 is bolted to the end plate 5, and there is a similar casting bolted to the end plate 6. Each of these castings carries a pair of sleeve bearings 24 about which the right- and left-hand building-drum supports 26 are rotatably supported. The outer end of each of the drum supports 26 is bolted to the internal ring gear 27, and the pinion 28 mounted on shaft 29 supported in bearing 30 meshes with this internal ring gear. The pinion 31, supported on the outer end of shaft 29, meshes with the internal ring gear 32. Plate 33 is bolted to this ring gear and is provided with a hub 34 whose roller bearing 35 rotates on spindle 37; the spindle 37 which is broken away at each end in FIG. 4. Inside of each end of the spindle are bearings 38 and 39 supporting the quill 40. The key 41 which slides in a keyway longitudinally fabricated in the quill 40, is bolted to the plate 33. Thus the plate 33 rotates with the quill inside of the spindle. The quill is fixed axially to base 1 by stanchion 44 and the spindle slides horizontally over the quill.

Figure 1:
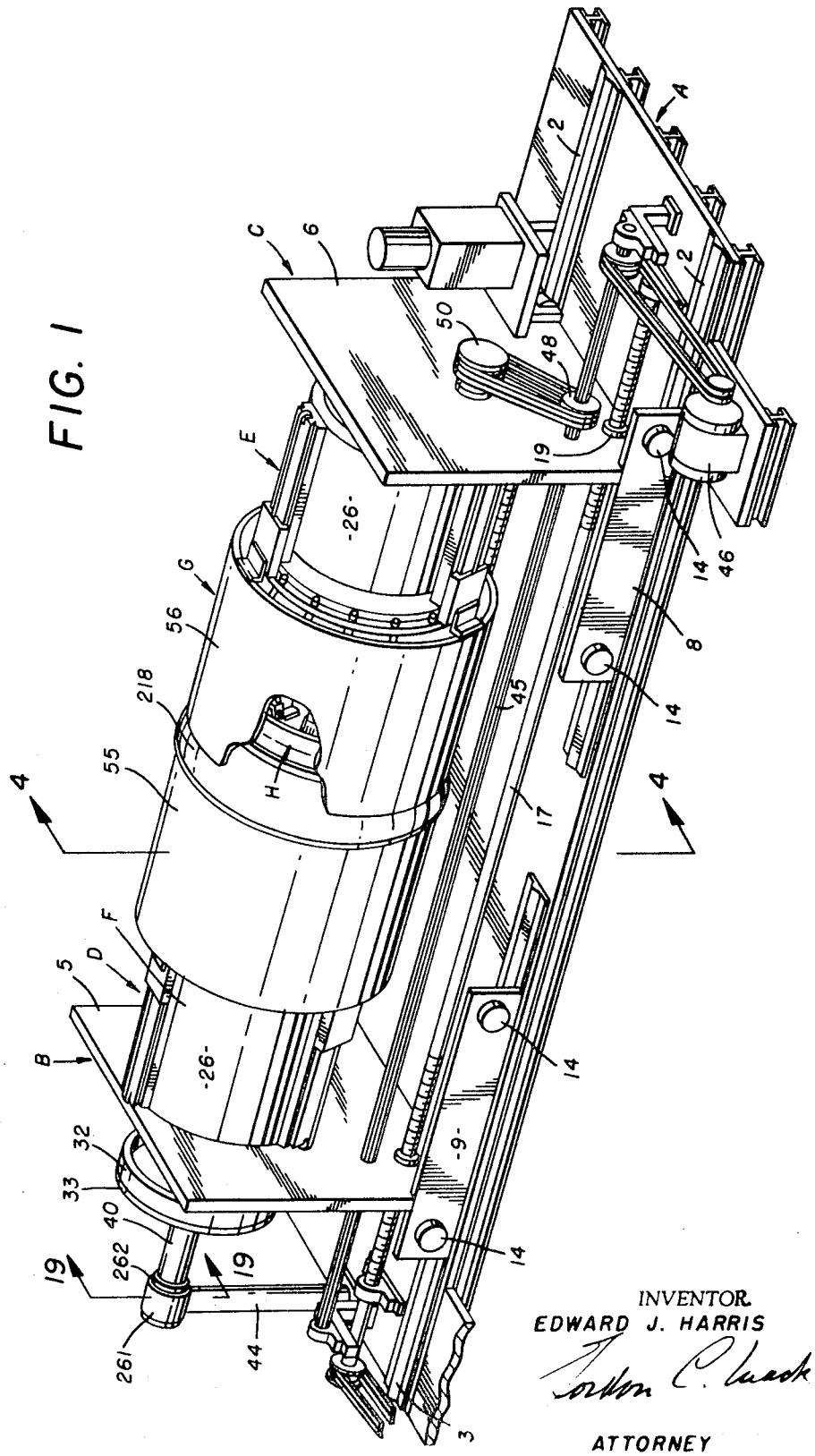
FIG. 1 is a perspective view of the tire builder, viewed from the rear, without a stitcher assembly.
Figure 2:
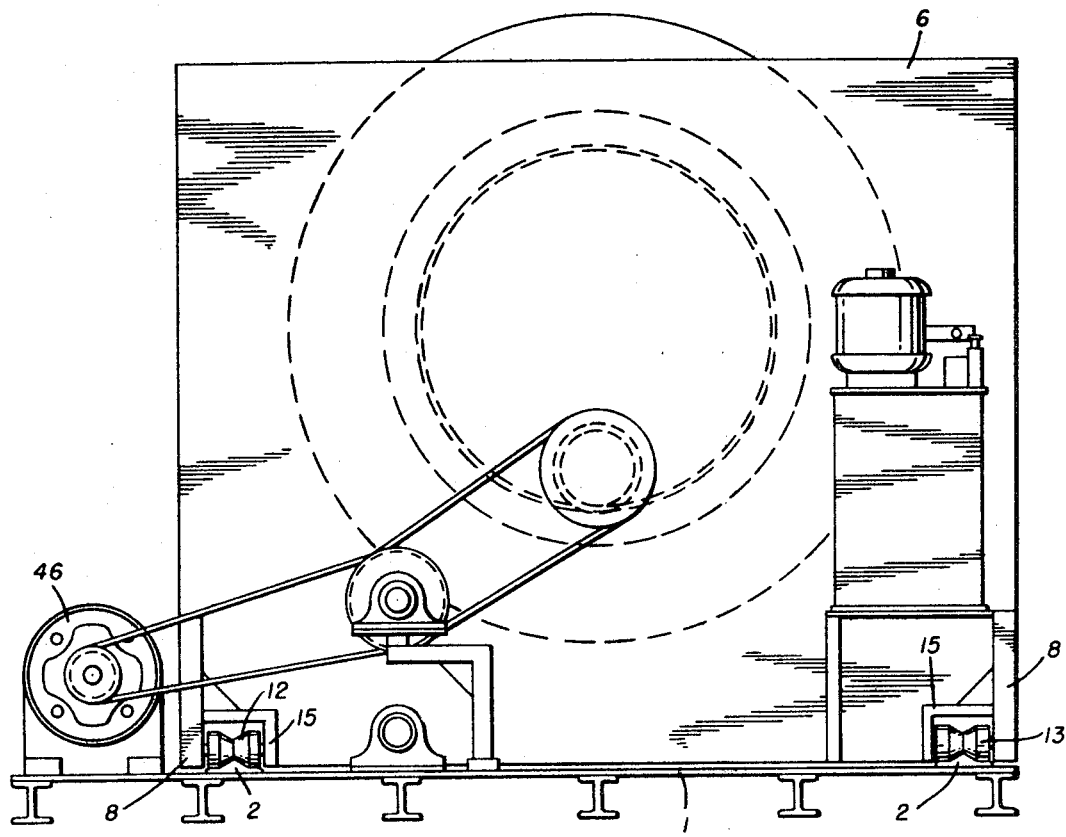
FIG. 2 is an end view of the tire builder as seen from the left side of FIG. 1.
Figure 4:
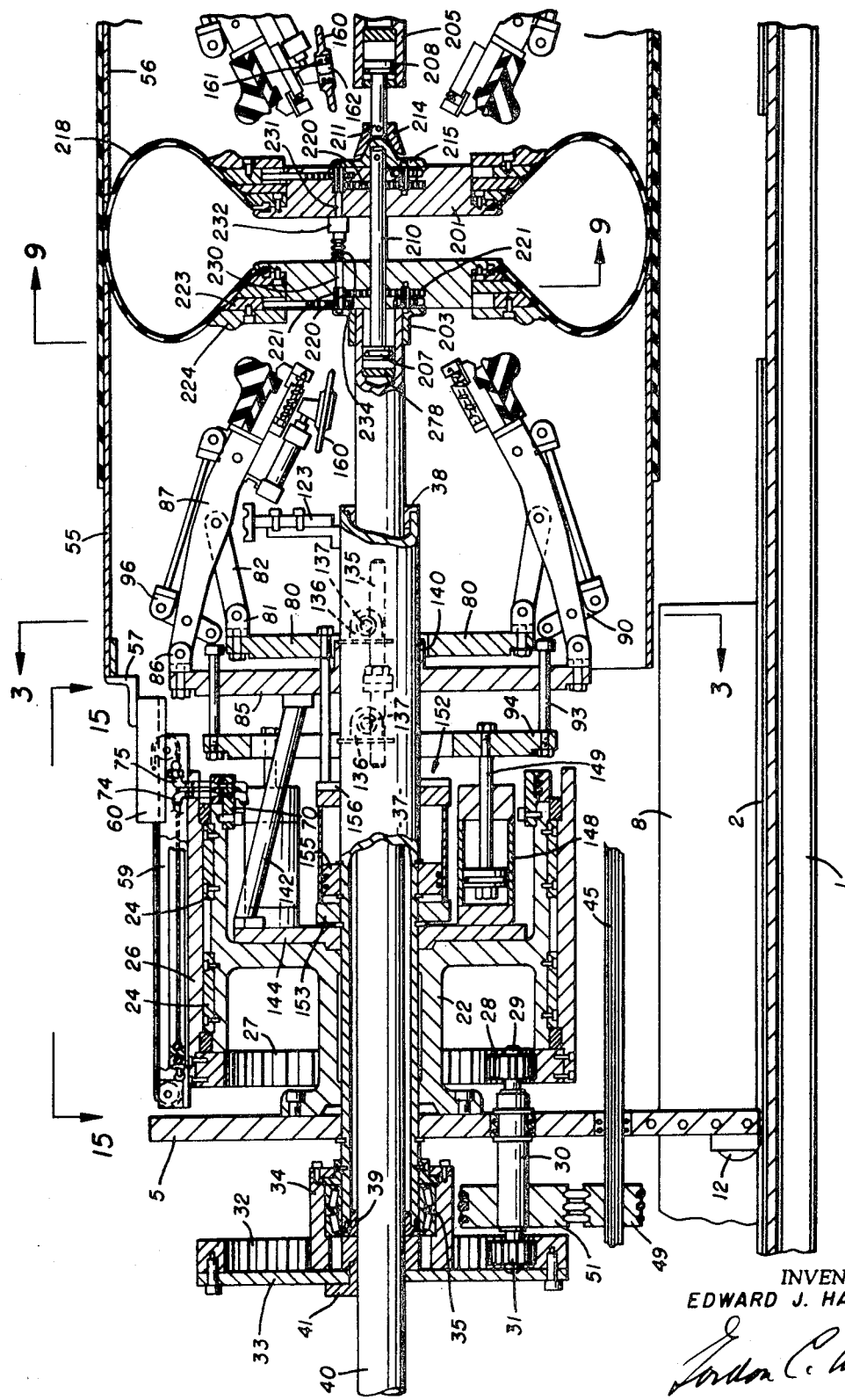
FIG. 4 is a section on the lines 4—4 of FIG. 1 showing the interior construction and carcass plies on the building drum.
Figure 5:
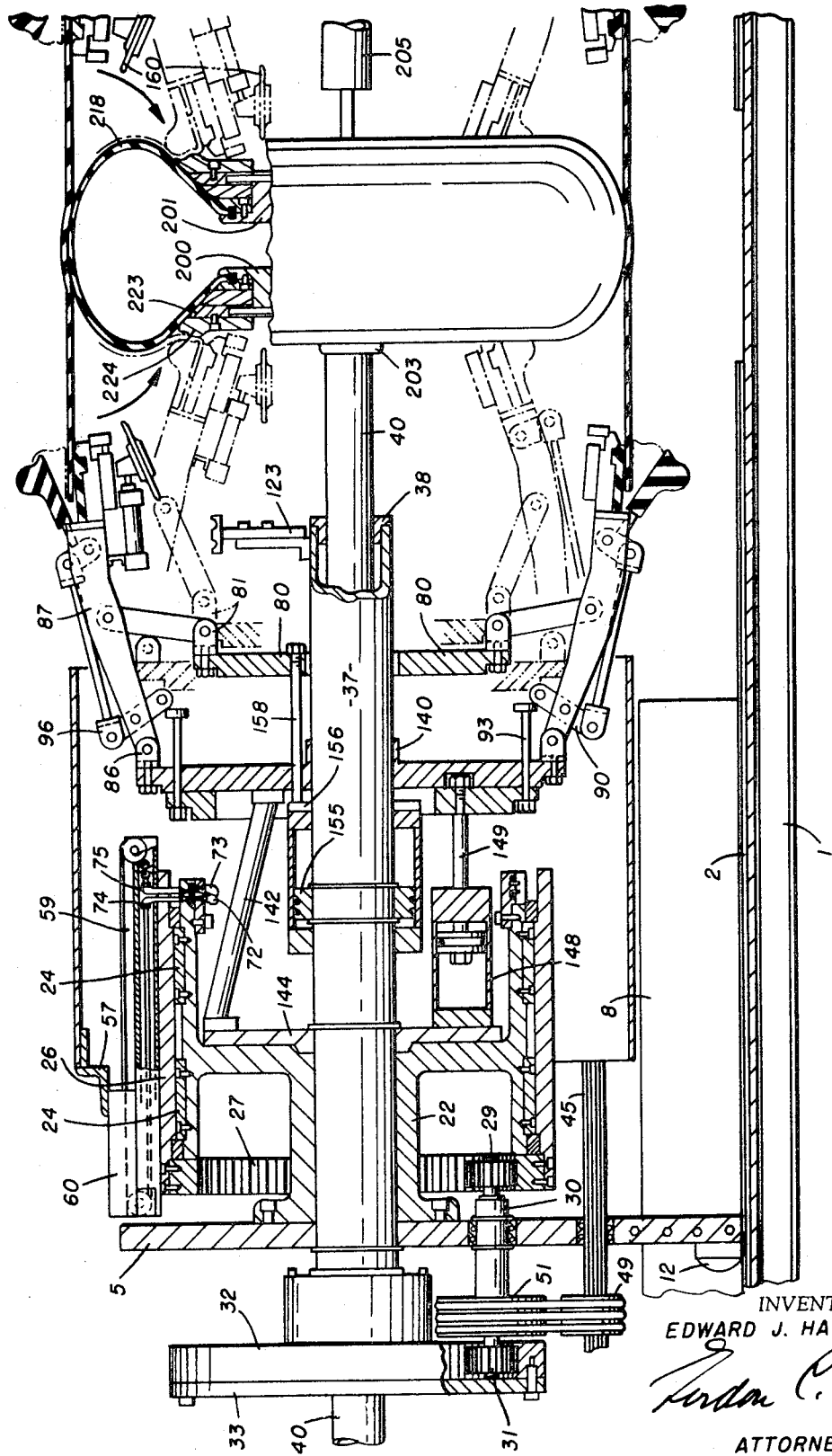
FIG. 5 is similar to FIG. 4, showing the plies being wrapped around the bladder.
Figure 6:
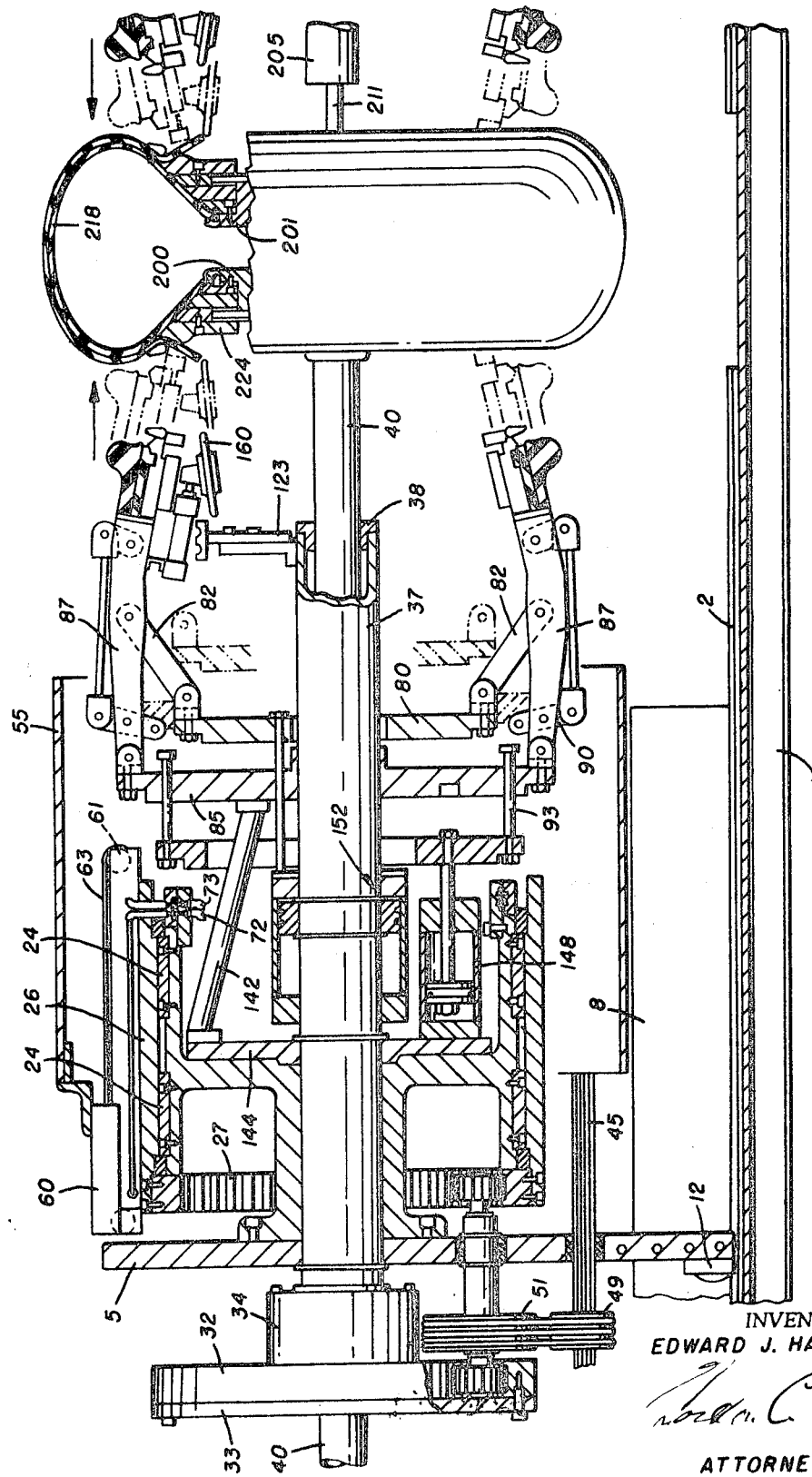
FIG. 6 is similar to FIG. 4, with the tire beads in position and the plies formed down to and below the beads.
Figure 17:
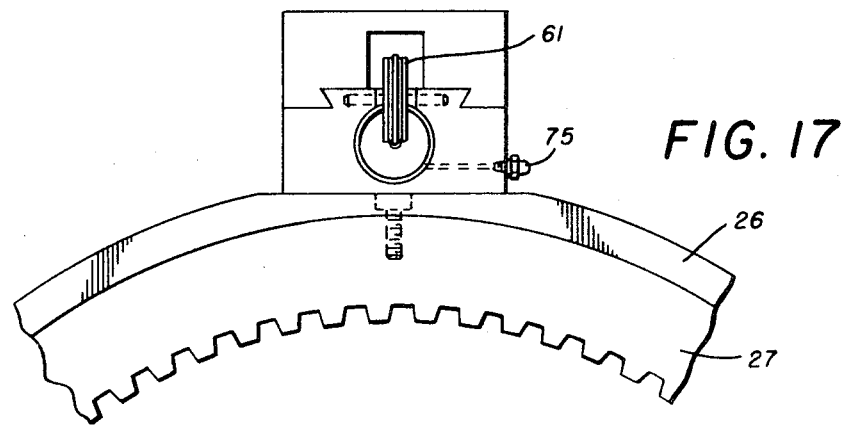
FIG. 17 is a section taken on the line 17—17 of FIG. 16 showing an end view of part of the building-drum support and slide mechanism.

Referring to FIG. 1, the spline 45 mounted in bearings is driven by motor 46. Pulleys 48 (FIG. 1) and 49 (FIG. 4) through belts, drive pulleys 50 (FIG. 1) and 51 (FIG. 4). At the two ends of the tire builder the pulleys 50 and 51 drive pinions which drive internal ring gears 32 and 27 (FIGS. 4 and 17). Thus the quill keyed to the internal gear 32 through plate 33 turns at the same speed as the building drum.

To economize room and lend stability to the tire builder, the building drums 55 and 56 as shown in FIG. 4 and other drawings, are mounted on brackets 57 supported on dove-tailed slides which are mounted on the building-drum holders. There are three such slides mounted on each drum. Each slide comprises a male part 59 which dove-tails into a female part 60 to which the drum is bracketed.

Figure 18:
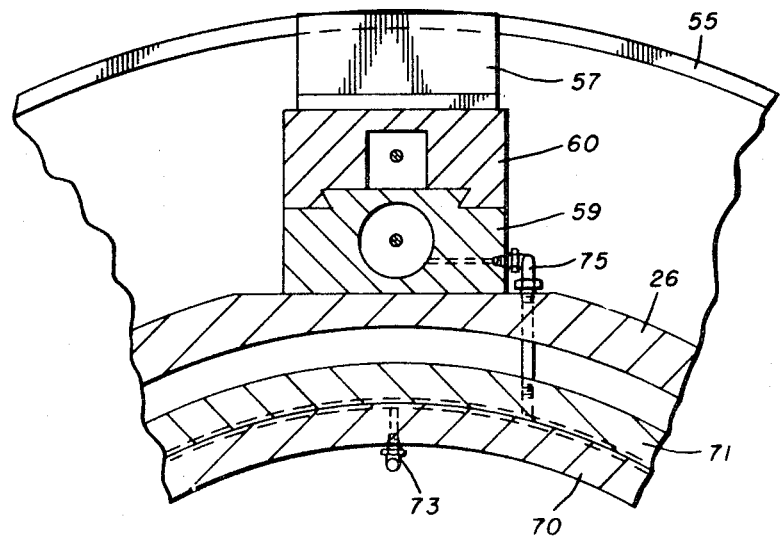
FIG. 18 is a section taken on the line 18—18 of FIG. 16 and showing parts of the building drum, the building-drum support, and the slide mechanism.

FIGS. 15 and 16 are enlarged views of a slide, and FIGS. 17 and 18 which are sections through FIG. 16, clearly show the slides and their environment. Sheaves 61 are mounted at the ends of the male portion 59 which is hollow and includes the cylinder 62. The cable 63 is clamped to the piston 64 and its ends are clamped to female slide 60. The cable encircles the sheaves 61 which are mounted on the slide. As air is introduced into the chamber 65 on one side of the piston (as will be explained in more detail in what follows) the piston is driven to the right, and when air is introduced into the chamber 66 the piston is driven in the reverse direction. This causes the female silde 60 to travel first in one direction and then in the other. In this way the drums are brought toward one another, and in the reverse direction are caused to telescope over the ends of the building-drum supports 26.

The air for the dovetail slides (FIGS. 4 and 16–18) is supplied to the respective chambers 65 and 66 through an air distribution system which includes a stationary manifold 70 fastened to the casting 22 and a rotary manifold 71 fastened to the building-drum support 26. The air passes from the stationary manifold to the rotary manifold through mating grooves in the two manifolds at their interface. The rotary manifold 71 is kept in position by the air lines 72 and 73 which are connected with the chambers 65 and 66. The air supply lines 72 and 73 are stationary and pass out through the end plate 5 and are supplied with air from any suitable source. The air lines 74 and 75 conduct air from the stationary lines 72 and 73 into each of the dovetail slides.

BELT-OPERATING MECHANISM

Figure 3:
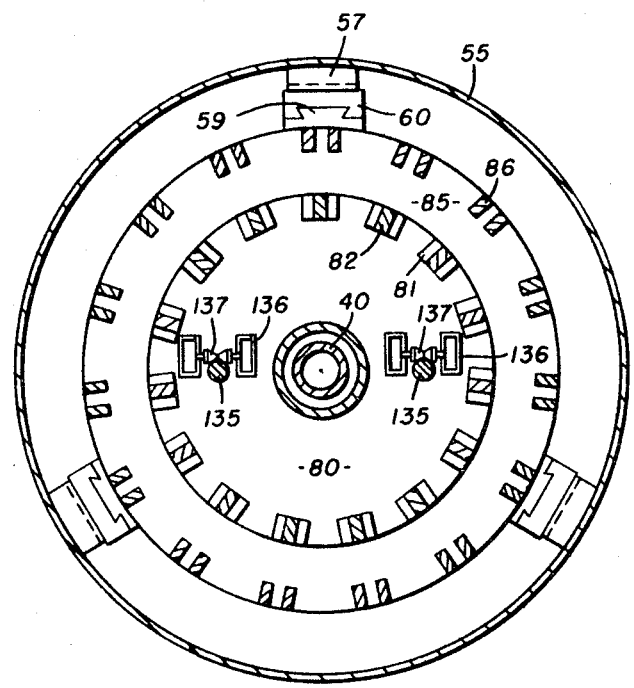
FIG. 3 is a vertical section taken on the line 3—3 of FIG. 4 showing guide rods which will be described below.

FIG. 3 is a section which clearly shows the quill 40 the spindle 37, reciprocating arm-holder plate 80 (also shown in FIGS. 4, 5, 6 and 7 which also show other elements here described) to which are fastened the clevises 81 in which one end of each arm elevator 82 is fastened. Behind the plate 80 is the stationary plate or arm holder 85 to which the clevises 86 are fastened. One end of each belt-supporting arm 87 is fastened in a clevis 86.

The parts just mentioned are shown in the enlargement, which is FIG. 10.

Figure 13:
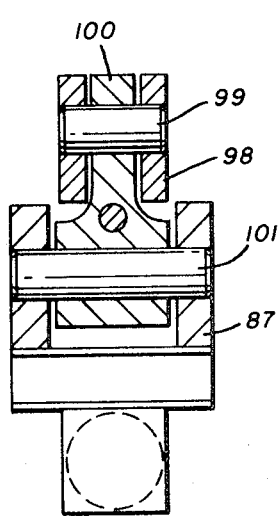
FIG. 13 is a section on the line 13—13 of FIG. 10 showing a detail of the construction of the shaping arms.
Figure 14:
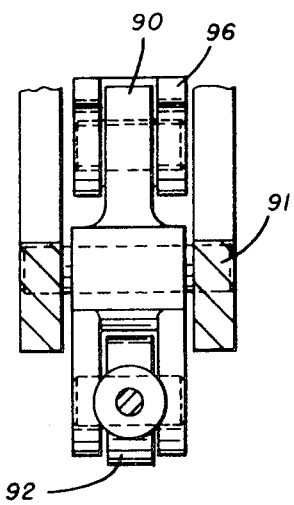
FIG. 14 is a section taken on the line 14—14 of FIG. 10 showing a detail of the construction of the belt-operating linkage.

Belt-opening lever 90 is pivoted to the arm 87 at 91. At the lower end is the roller 92 which is actuated by pin 93 which is mounted on reciprocating belt-opening plate 94 (FIG. 4). At the other end of the lever 90 is the clevis 96 to which is fastened the connecting rod 97. Clevis 98 at the other end of the connecting rod is pivoted at 99 to fingerholder 100 which is pivoted at 101 to the arm 87. Most of these parts are shown in section in FIGS. 13 and 14. The finger 105 which supports the outer belt 106 is held by the lever 100. There is an offset 107 on the finger which fits against the edge of the belt 106. The inner belt 110 is mounted on an end part of arm 87 which is slotted at 112 to hold the belt in position, just as the end of the finger 105 is enlarged at 113 to hold the outer belt in place.

Figure 11:
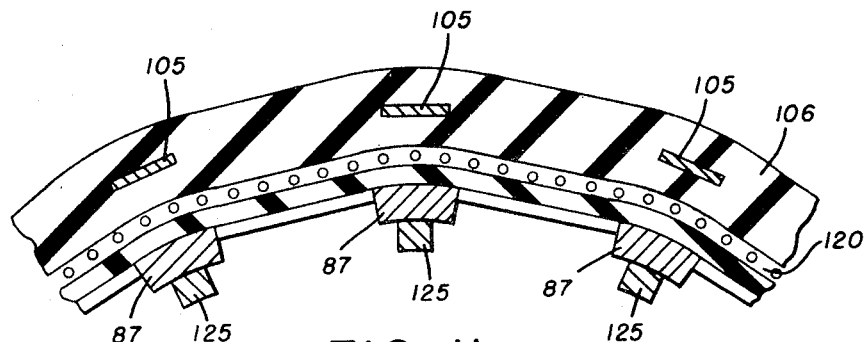
FIG. 11 is a section taken on the line 11—11 of FIG. 10 with the belts in the position shown in FIG. 4, gripping a carcass band, ready to shape the band around the bladder.
Figure 12:
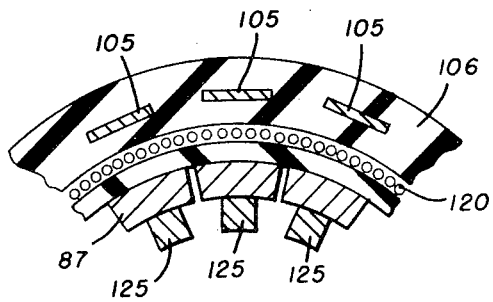
FIG. 12 is similar to FIG. 11, but with the belts in the position that they occupy after completing the shaping of the band around the bladder.

The clamping surfaces of the two belts 116 and 117 are preferably ribbed or otherwise held by spaced projections to provide a firm grip on the tire material and maintain it in an extended position, and also to permit the movement of the cords together in reducing the diameter of the plies after gripping them, as will be readily understood by comparing the spacing of the cords in FIGS. 11 and 12. Also, a comparison of FIG. 11 with FIG. 12 shows that the diameters of the respective belts are greatly reduced as the elevator actuated by movement of the plate 80 brings the inner ends of the arms 87 closer together. FIGS. 11 and 12 show the ply 120 and show how the ends of the cords 121 in the plies are brought together.

The beads 122 (FIGS. 6A, 7A and 7B) are manually removed from bead storage 123 and are placed on the bead setter 125 against the end 126 of the arm 87. The bead setter 125 is spaced from the spring-loaded support 128 by the spring 129 which encircles the pin 130.

It has been explained that the end plate 5 is reciprocally moved by the screw jack shaft 17 (FIG. 1). This moves the whole carriage toward and away from the tire which is being built. As it moves toward the tire, the bead setter 125 is moved into contact with the tire as shown in dot-dash lines in FIG. 6 and also in FIG. 6A, depressing the bead setter 125 and removing it from its support of the bead. Then, as the carriage moves away from the tire, the bead setter 125 returns to its former position.

There are a plurality of arms 87 and the accompanying mechanism on each side of the tire which is being built. For truck tires fifteen arms on each side of the chuck may be desirable. A lesser number will be used for a passenger-tire machine and a greater number for larger tires such as the off-the-highway or earth-mover tires.

Referring to FIGS. 3 and 4, we find a guide track 135 on each side of the spindle and fastened to the stationary arm holder 85. The pillow blocks 136 support rollers 137 which ride on the guide tracks 135. As shown in FIG. 4, there are two sets of rollers for each guide track, the pillow blocks 136 toward the right being fastened to the arm-elevator holder 80 and the pillow blocks to the left being fastened to the belt opener 94. The hub 140 on stationary plate 85 is bolted to the spindle 37 (FIG. 4). The plates 80 and 94 are supported only by the guide tracks 135. The plate 85 is advantageously steadied by the support 142 (FIG. 4) the left-hand end of which is fastened to the cylinder holder 144 which in turn is bolted to the casting 22. There are two identical cylinders 148 fastened to the cylinder support 144 on opposite sides of the spindle 37. The piston rods 149 which are reciprocated within the cylinders move the belt opener 94 and this, in turn, through the pins 93 actuates the levers 90 (FIG. 10).

The spindle 37 is stationary. Mounted about it is a third cylinder 152 (FIG. 4). The left end of this cylinder 153 is bolted to the cylinder holder 144 and remains stationary. The piston 155 is connected with the hollow piston rod 156 by means not shown, and reciprocates along the spindle as the piston 155 reciprocates. There are three push rods 158 (only one of which is shown in FIG. 4) which project from the piston rod 156, and these are attached to the arm-elevator holder 80 through openings in plates 94 and 85. Thus, as the piston reciprocates, the belts at the ends of the arms 87 expand and contract. This movement is possible because the plate 85 is stationary and the belt-opener plate 94 reciprocates, and through the pins 93 operates the levers 90 which alternately separate the outer belt from the inner belt and bring the two belts together.

THE TURN-UP WHEEL

There is only one turn-up wheel 160 on each side of the machine. These are shown in FIGS. 4, 6A, 7A and 7B, and one is shown in greater detail in FIG. 10. This turn-up wheel 160 rotates freely on a bearing 161 (shown within the wheel at the right side of the tire in FIG. 4). This bearing is mounted on a holder 162 mounted on the end of piston rod 163 in the cylinder 164 which is suitably supported from the arm 87.

Figure 7:
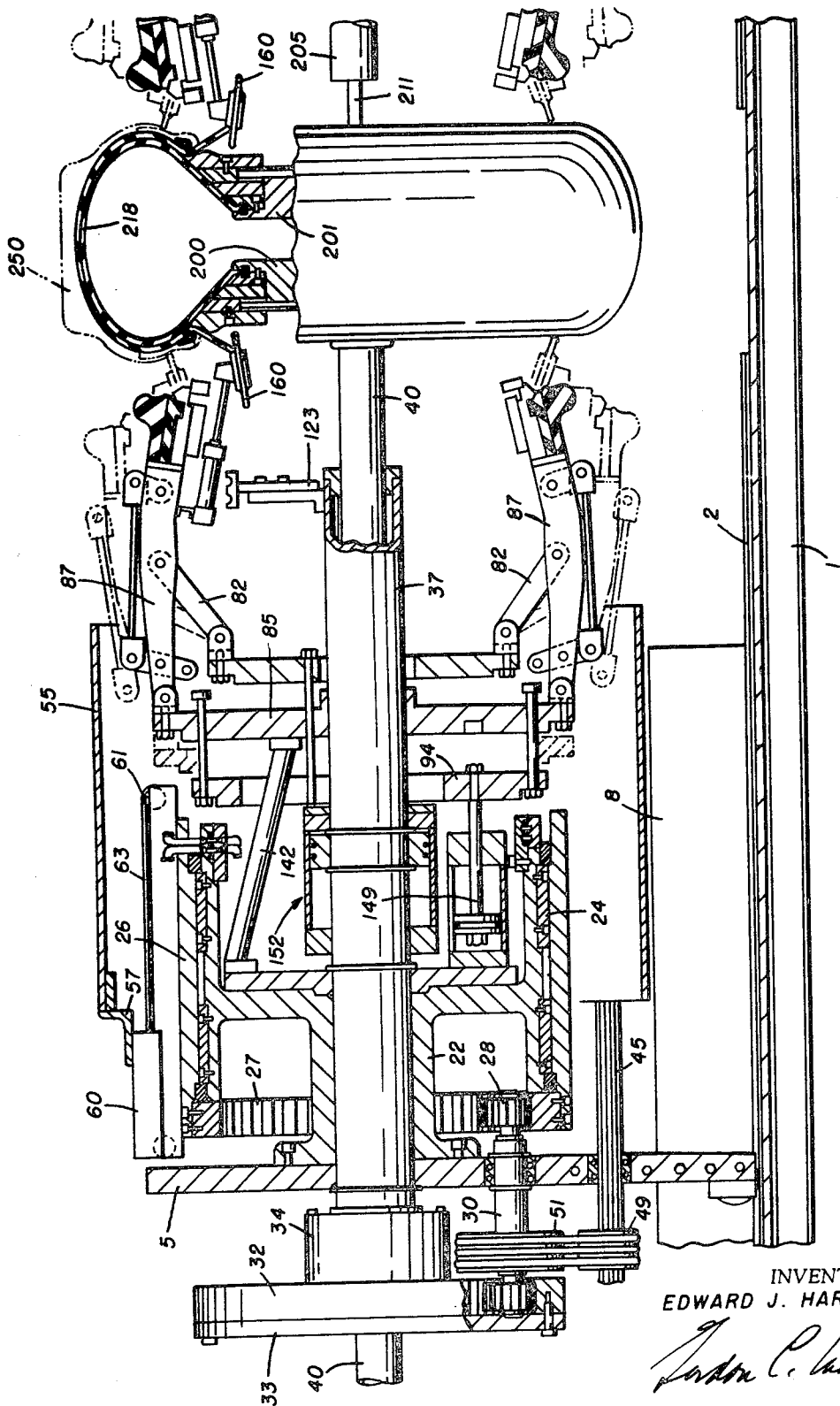
FIG. 7 is similar to FIG. 4, but with the plies being turned up over the beads and the tread stock shown in phantom in position on the carcass plies.
Figure 7A:
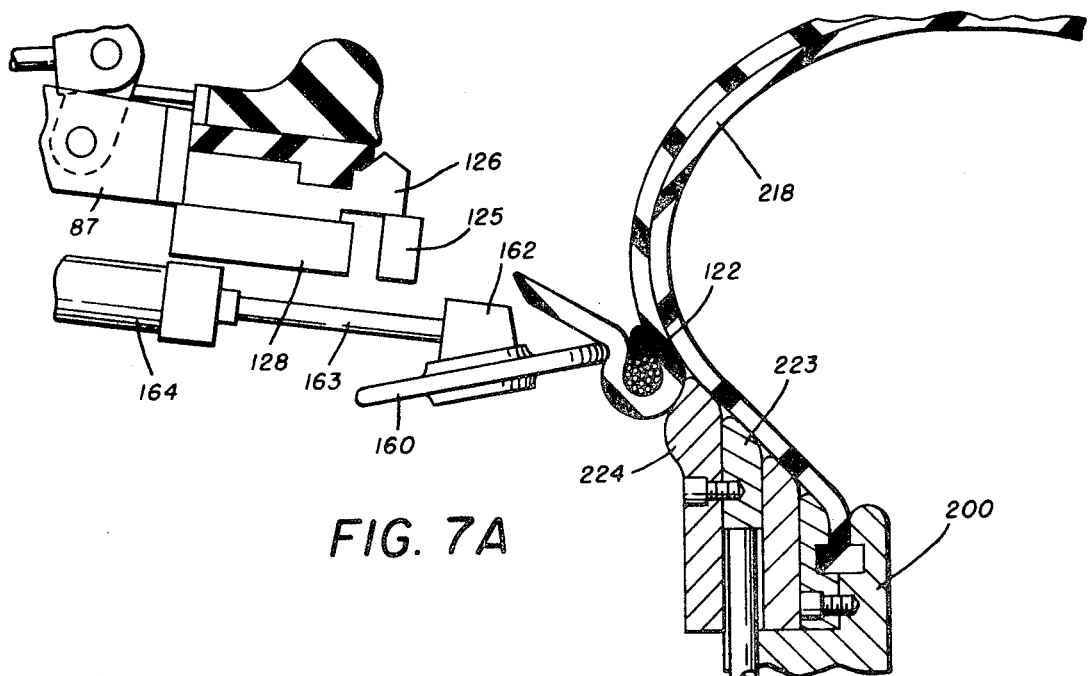
FIGS. 7A and 7B are details of the bead setter and turn-up wheel at different stages of the turn-up operation.
Figure 7B:
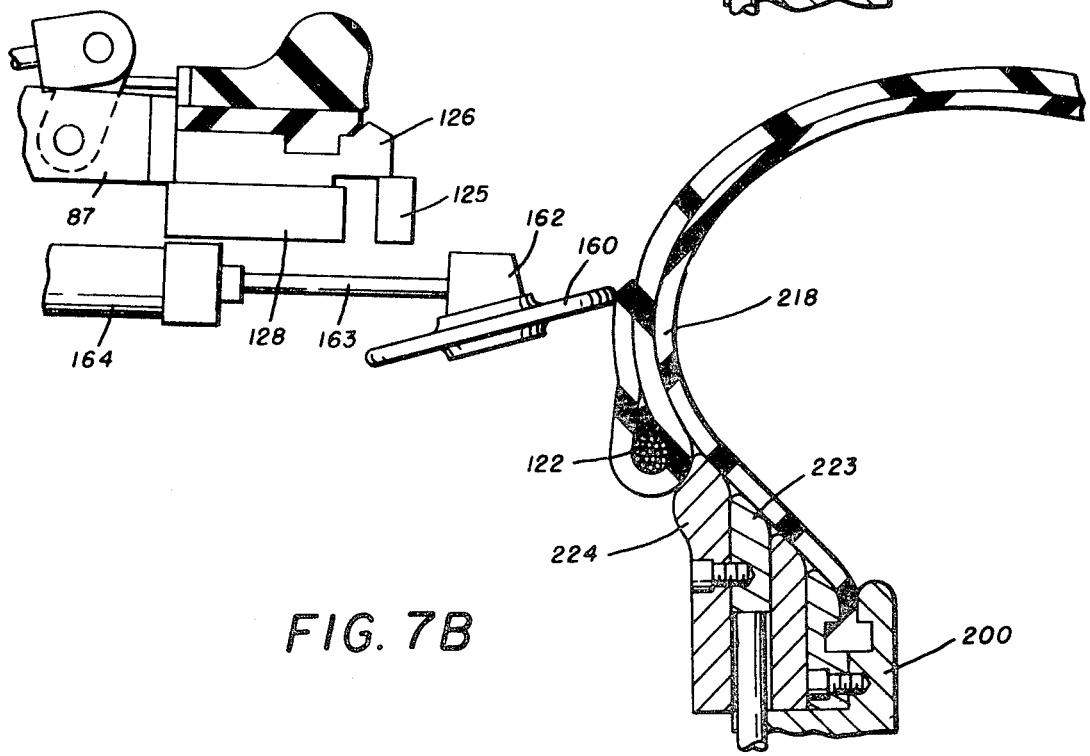

After the arms 87 are extended to press the bead setters into contact with the band, the carriages are moved from each other and the arms 87 are brought together to a position whereby turn-up wheel 160 is below the edges of the shaped band, as shown in dotted lines in FIG. 4. Then the chuck is rotated and turn-up wheel is extended by piston rod 163 so as to make contact beneath bead 122. Arms 87 are then moved radially apart causing the turn-up wheel 160 to turn the band edges around bead 122 (FIGS. 7A and 7B). By reversing the operation of the turn-up wheel, the edges of a band can be turned under instead of over the bead.

THE CHUCK

The chuck is formed of horizontally separable bodies 200 and 201 (FIGS. 4 and 8). The body 200 is fastened to the quill 40 by the hub 203. On the other side of the chuck is the reciprocable holder 205 which is usually non-rotatable. It is located within a right spindle (not shown) opposite the left spindle 37 shown in FIG. 4. (See also FIG. 3.) The right spindle is identical with the left spindle and a drum support (not shown) similar to the left drum support 26 rotatable on a casting identical with the left casting 22 (FIG. 4) and supported by an end plate 6 (FIG. 1). During the shaping of the tire it assists in supporting the chuck which is primarily supported by the quill 40, and separates from the chuck when the tire is to be removed.

The inner end of each of the quills 40 and 205 is fabricated as an air cylinder with the pistons 207 and 208 slidable therein and operating the piston rods 210 and 211. The female cone center 214 is pinned to the inner end of the piston rod 211 and the male cone center 215 is pinned to the inner end of the piston rod 210. The male cone center rotates within the female cone center. The male cone center is bolted to the chuck body 201 so that both pistons assist in support of this chuck body.

The chuck bodies 200 and 201 are identical. The construction and operation of the chuck body 200 are illustrated in FIG. 9. The core or bladder 218 (FIGS. 4 and 9) is fastened to the two chuck bodies so as to provide a leak-proof chamber between these chuck bodies and within the bladder. The gear 220 is rotatably positioned near the outer surface of each body and three pinions 221 mesh with this gear and are rotated by it. These pinions mesh with the racks 222 the outer ends of which are threaded into the three bead-ring supports 223 in each chuck body (FIG. 9). Three bead-ring segments 224 are bolted to these bead-ring supports 223. As the pinions move the racks 222 in and out, the bead-ring supports and bead rings move with the racks. Parallel to the racks 222 in each bead-ring support, are two bead-ring support guide pins 226 fastened to the body and reciprocated in and out of the holes 227 bored in the bead-ring supports.

The spaces between the bead-ring segments 224 of the expanded chuck give no difficulty in setting the beads because the bead cables easily bridge the distance between the segments and resist the turn-up pressure from the turn-up wheel 160. This takes place outside of the chuck. If the chuck is expanded to a large diameter, difficulty may arise inside of the chuck where the bladder 218 may become pinched between the segments 224 when they are returned to their unexpanded size. To prevent this, the modified structure shown in FIGS. 9A and 9B may be desirable. Here gap-closers 228 fastened at one end by bolts 228' to one edge of a segment 224 bridge the gap between this segment and an adjacent segment, and the bolt 229 near the edge of this adjacent segment rides in the slot 229' in the gap-closer, and retains the bladder within the walls of the chuck so that it cannot be between the segments.

One of the pinions 221 associated with each of the chuck bodies is connected so that these two opposed pinions rotate together and thus the gears and racks of the two chuck bodies operate simultaneously. The connection is made by means of the rod 230 attached to the pinion in the chuck body 200 and the shorter rod 231 associated with the pinion in the chuck body 201. At the inner end of the rod 230 is the square-holed bushing 232 which receives the rod end 231 which is square. The bushing 233 is spring-pressed by the spring 234 when the two chuck halves are brought together by the inward movement of the piston rod 207 which is the position of the two chuck bodies shown in FIG. 4.

The inflation and vacuum deflation of the bladder will be discussed below. The dimensions of the chuck are preferably proportioned with respect to the diameter of the building drums so that for a smaller tire it is not necessary to separate the bead rings of the bladder or bring them closer together. For larger tires it is desirable to have the chuck bodies mounted so that they may be moved away from one another in order to provide sufficient space between them to suck the bladder down out of the way of the tire before it is moved off of the chuck. FIG. 8 shows the bladder sucked down in between the chuck bodies and the tire is being moved to the right, away from the chuck, for complete dismounting. In FIG. 8 the bead rings have been retracted (as explained in connection with FIG. 9) so that the largest diameter of the bead rings is small enough to permit the tire to be moved away from it.

The cone centers 214 and 215 have been separated in FIG. 8 by retraction of the cone 214 (the quill 40 being stationary), and by separation of the carriages fastened to the end plates 5 and 6 as shown in FIG. 1. FIG. 8 shows the carriages retracted and the drum parts 55 and 56 separated, and the space between the chuck and the cone 214 has been increased so that the tire, when separated from the chuck, can be passed down through the opening thus formed. The cone center 214 on the end of the quill 205 is then again brought into contact with the cone center 215 by movement of the carriages and the piston rod 211. In this manner the drum parts 55 and 56 are again brought into contact with the bladder when it is again inflated (as shown in FIG. 1).

Referring to FIG. 9, the air cylinder 240 located on the chuck half 200 (and not shown in FIG. 4 or 8 in order to clarify the various views) is fastened at one end of the chuck body 200 and at the other end through the clevis 241 to the gear 220. Thus on expansion of the cylinder the gear is rotated counterclockwise and on retraction it is rotated in the reverse direction; thus bringing the bead-ring supports together for removal of a tire and expanding them again for the construction of a new tire thereon.

As best shown in FIG. 8, the bead rings on the end of the bladder are held between projections at the inner edge of the chuck bodies 201 and the rings 245. The inserts 246 between these rings and the bead-ring supports 223 (FIG. 8) are optional but are advantageously employed in order to change the location of the bladder beads for the manufacture of tires of different sizes. Thus, by omitting the inserts 246 or employing narrower inserts, the bladder beads are shifted outwardly and accommodate larger tires.

FIG. 8 shows a completed tire in which the edges of the carcass band have been turned up around the tire beads. The tread 250, breaker 251 and sidewalls 252 have been shaped over the band formed on the drums, and this may be done after the band has been formed on the bladder or simultaneously therewith.

THE AIR AND VACUUM CONNECTIONS

Figure 19:
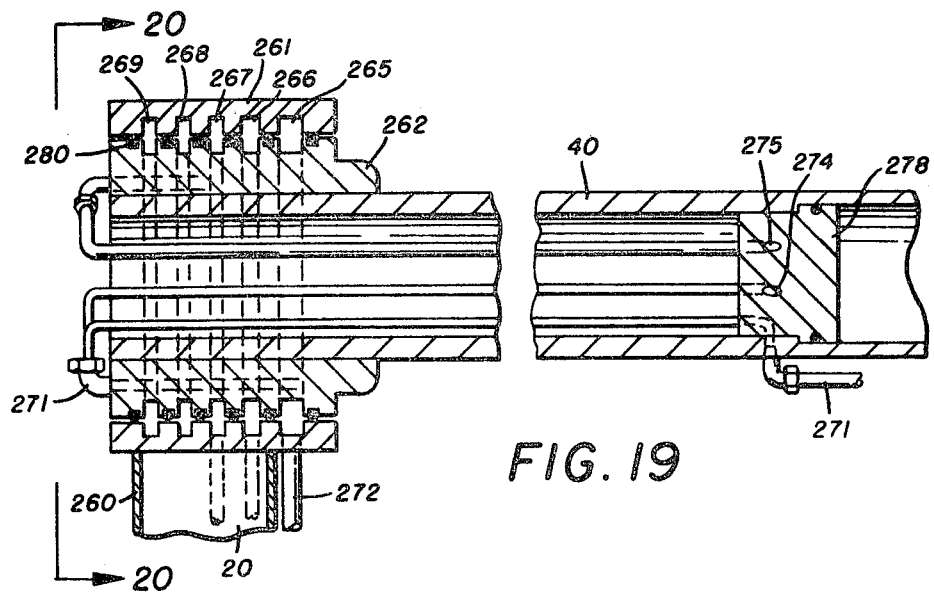
FIG. 19 is a section taken on the line 19—19 of FIG. 1 showing the construction of the rotary air unit at the end of the quill.
Figure 20:
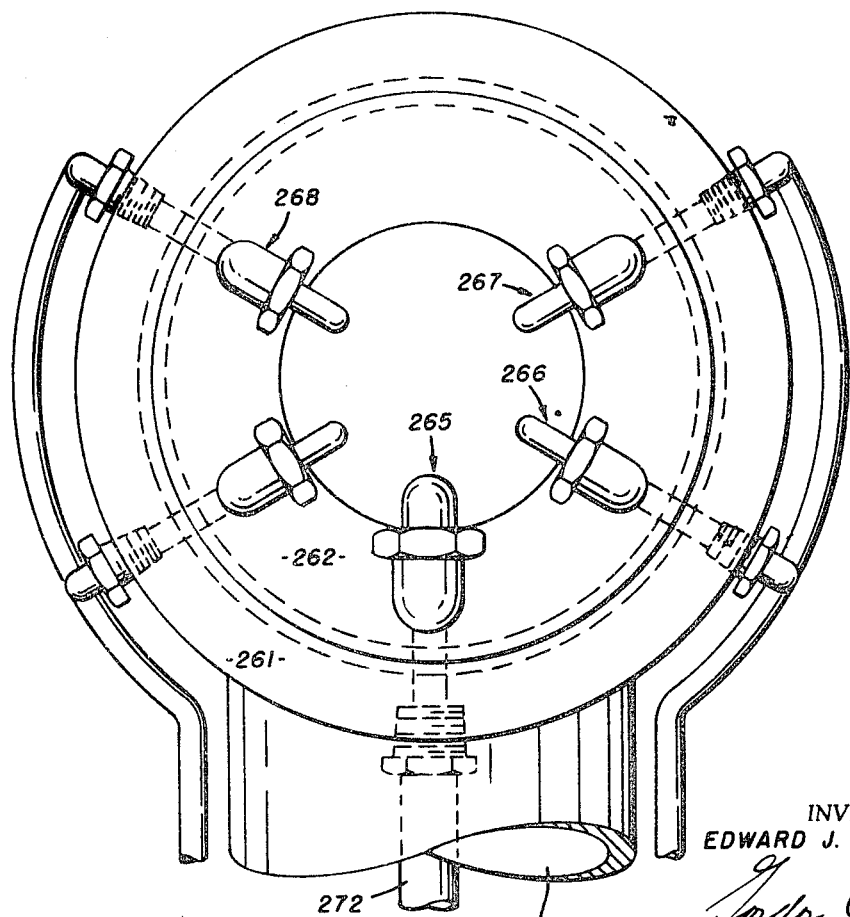
FIG. 20 is an end view on line 20—20 of FIG. 19 showing the air lines on the rotary unit.

FIGS. 19 and 20 relate to the air and vacuum system which inflates and evacuates the bladder, expands and retracts its bead rings by means of the cylinder 240, and expands and moves the chuck body 201 toward and away from the chuck body 200 by means of the piston 207 (see FIG. 8).

Referring to FIG. 1, the stanchion 44 fastened on the base 1 supports the outer stationary manifold 261, shown also in FIGS. 19 and 20, and within it is the rotary manifold 262 fastened to the quill 40 and rotated by it. The inner face of the manifold 261 is grooved and the outer face of the manifold 262 is formed with mating grooves to form air passageways 265, 266, 267, 268 and 269. It is noted that the air passageway 265 is larger than the other passageways because it is connected with the pipe 271 and through the conduit 272 it is connected alternatively with an air supply and a vacuum pump, and inflates and deflates the bladder.

The quill 40 rotates with the spindle 37 and beyond the spindle the line 271 emerges from the quill (as shown in FIG. 19) and enters the chuck body 200 which rotates with the quill and provides means for inflating and deflating the bladder. FIG. 19 indicates how the line 271 emerges from the quill, and the lines 274 and 275 similarly emerge from the quill. The lines 274 and 275 fed from the air grooves 266 and 267, emerge to operate the cylinder 240 (FIG. 9) which is affixed to the exterior of the chuck body 200. The line 268 does not emerge from the quill but goes to the end 278 of the piston 207 to move the piston 207 and separate the chuck body 201 from the chuck body 200. The air groove 269 is connected with the line which emerges from the quill and enters the quill on the other side of the piston 207 to retract the piston rod 210 and bring the chuck bodies together.

Bounding each air groove are two of the O-ring gaskets 280 which are embedded in the rotary manifold and prevent air leakage from their respective air grooves.

THE STITCHER

The stitcher shown in FIGS. 21, 22 is of any conventional type. The stitcher wheels 290 reciprocate on the right- and left-hand screws 291 (FIG. 21) and as they are separated they contact the rotating tire from near the center portion to the outer edges, which forces air trapped between the component parts of the tires to be exhausted from between these parts, first from between the individual plies and then eventually the tread and sidewalls, as shown in FIG. 21. The stitcher wheels are moved toward and away from the tire (see the full-line and dot-dash line representations in FIG. 22) by the air cylinder 293 provided with air connections (not shown). As the air cylinder 293 retracts, the stitcher wheels form contact with the tire. After the carcass parts have been well stitched, the cylinder 293, by retracting, moves the stitcher wheels 290 away from the carcass and against the rubber roll 295. The stitcher wheels now come in contact with rubber roll 295 driven by motor 296 which rotates the stitcher wheels towards each other to a central part of the rubber roll 295 where the motor stops.

BAND ROLLER SUPPORT

Turning now to FIG. 23, an optional device is shown for use with limp or flexible plies as well as plies of great width which do not have sufficient stiffness to be self-supporting when withdrawal of the building drums from contact with the bladder might allow the plies to sag, making it difficult to secure the plies between the inner and outer belts. This band roller support is attached only to the top arms 87 on opposite sides of the chuck; only one such device being shown.

This support is attached to the arm 87 below the bead setter 125. A roller 301 is journaled on roller support 302 which is pivotally mounted on pivot 303 fastened to bead-setter support 128. The air cylinder 305 is pivotally attached to the support 306 which extends from arm 87 and the piston rod 308 is pivotally attached through clevis 309 to the supporting arm 302. When the device 303 is not needed the piston rod is retracted and this swings the roller 301 to the position shown in dotted lines in FIG. 23 where it is tucked in, out of the way.

TIRE MANUFACTURE

Radial and bias-angle tires manufactured for different purposes will have different component parts. It is not necessary to discuss all of these here. The following description applies to tires generally.

Preliminary to the assembly of any tire, and while the tire carriages are separated, and the bladder of the chuck is deflated and the chuck bead rings are retracted, one or more beads are placed on bead storage 123 on each side of the machine. The chuck bodies are brought close together, the bead rings of the chuck are extended, and the bladder is inflated. The carriages are moved toward each other and the drum parts are closed into contact with the inflated bladder, as seen in FIG. 1.

One or more carcass plies are laid up on the drum parts into an endless band by rotating the drum parts. These and later laid up tire components are stitched in a usual manner to remove entrapped air. This laying up of plies may be repeated several times as desired, with or without shaping the band between each application of plies. The carriages and drum parts are now retracted away from each other, and simultaneously the band roller support 300 is extended under the top of the band on each side of the chuck, if required. The carriages are located at positions where the belts, radially extended, are at the edges of the band. Then the outer belts are opened and the carriages are moved inwardly so that desired amount of the edges of the band are clamped between the inner and outer belts. Just prior to this the roller supports 300 are dropped, if they have been extended.

Now, the diameters of the belts are decreased while simultaneously the carriages are moved toward the chuck and the band is shaped over the bladder. The movement of the carriages toward the chuck and the retraction of the edges of the belts is stopped when the band edges are brought to the size of the tire beads to be applied thereto. The outer belts are then opened, releasing the band edges, and the carriages are removed away from the chuck.

A tire bead from each tire bead storage is manually placed on the bead setter on each side of the machine, the arms holding the bead setters having been positioned to accept the particular bead size. The carriages are now moved inwardly toward the chuck and set the beads against the tacky band. The carriages are again retracted and the arms are repositioned so as to bring the turn-up wheel into the proper location under the band edges and the beads thereon. The piston rods holding the turn-up wheels are extended so as to make contact with the band underneath the bead. The chuck is now rotated, causing the turn-up wheels to rotate with it, and the arms 87 are radially expanded so that the elastic pressure of the pneumatic cylinder allows the turn-up wheels to follow the contour of the beads while turning up the ply edges over the beads. Additional bands may be laid up by closing the drum parts and repeating the aforesaid process, and additional beads may be set in the same manner on the same tire.

The application of the breakers, tread and sidewalls, and chafer strips, may be executed in the same manner as described for the plies or they may be assembled directly over one or more plies and shaped together over the previously shaped carcass.

The carriages are then moved away from each other, the cone on the side of the machine is separated from the chuck, the bladder is deflated, and the chuck bead-ring segments are retracted. The tire is then ready for removal from the machine, as shown in FIG. 8.

Some tire constructions require the turn-under of some plies, and this may be accomplished, as described.

The manufacture of tires is not limited to the procedures described above, but may be varied in many respects, as desired. The various operations can readily be programmed to be operated electrically.

The invention is covered in the claims which follow.

I claim:

1. In a tire builder which comprises a flexible, inflatable core bladder and support means therefor and two drum parts of the same outside diameter with means for separately supporting the same and means for moving them toward and away from the bladder parallel to its axis, with the inner edges of said drum parts touching said bladder near its portion of greatest diameter when said parts are positioned closest to one another, the improvement which comprises a permanent connection between one side of the bladder support means and one drum supporting means and the other side being separable from its drum supporting means, and means non-rotatable with respect to the bladder projecting inwardly toward the bladder from the drum support means for grasping the respective edges of a carcass band formed on the drum parts when touching the bladder, and means for bringing said projecting means toward the inner diameter of the bladder and thereby shaping the edges of the band over the bladder, said drum parts and grasping means being separately supported and movable toward and away from the bladder independently of one another.

2. The tire builder of claim 1 in which the other side of said bladder support means is separably supported by the other drum supporting means.

3. The tire builder of claim 1 in which the drum parts are supported by carriages which are movable in alignment with one another, said drum parts being telescopable over at least a part of the respective carriages.

4. In a tire builder which comprises a flexible, inflatable bladder and two drum parts movable toward and away from the bladder, support means for the drum parts, means projecting inwardly from said support means for grasping the respective edges of a carcass band formed on the drum parts, the improvement in which said projecting means is non-rotatable with respect to the bladder and movable toward and away from the bladder independently of the movement of the drum parts toward and away from the bladder.

5. The tire builder of claim 4 in which the inner surface of at least one grasping means has a ribbed surface.

6. The tire builder of claim 4 in which at least one of said surfaces in each grasping means is resilient and has projections thereon.

7. The tire builder of claim 4 in which means is provided for moving the inner ends of the projecting means toward and away from the axis of the bladder independently of the movement of both the drums and the projecting means.

8. The tire builder of claim 7 in which said means for moving the inner ends of the projecting means toward and away from the axis of the bladder is a hollow piston rod which reciprocally moves linkages connected to the projecting means.

9. The tire builder of claim 4 which includes means for rotating the drum parts while the projecting means are not rotated.

10. A tire builder which comprises a core adaptable for shaping a tire carcass thereon, a drum part on each side of the core and a support for each drum part with means for reciprocating the supports axially toward and away from the core, with means for moving each drum part axially toward and away from the core independently of its support.

11. The tire builder of claim 10 in which the drum parts are driven by a splined jack shaft, and means for rotating the jack shaft.

12. The tire builder of claim 10 in which a spindle passes through one of the drum support means, and the bladder is mounted on a chuck which is permanently supported from one side by a quill passing through the spindle, with means for rotating said quill without rotating the spindle.

13. The tire builder of claim 10 in which the drum parts are mounted on the drum support means by slidable dove-tailing parts.

14. The tire builder of claim 4 in which the inwardly projecting means for grasping the respective edges of a carcass band each includes a clamp on its inner end with concentric elastic belts connecting the respective jaws of the several clamps, with means for opening and closing the jaws, and bead supporting means slidable longitudinally of the projecting means and projecting toward the bladder from the inner end thereof.

15. The tire builder of claim 14 in which the means for clamping the elastic belts on the edges of the carcass are connecting rods connected to the clamping jaws.

16. The tire builder of claim 4 in which bead setters project inwardly from the drum supports and are movable toward and away from the bladder independently of the movement of the drum supports.

17. The tire builder of claim 16 in which a bead turn-up wheel is supported by the projecting means on each side of the bladder and means is provided for moving the turn-up wheels toward and away from the bladder independently of any movement of the bead setters.

18. In a tire builder which comprises two drum supports and two drum parts movable toward and away from a core for shaping tires located between them, the improvement which comprises non-rotatable means for grasping both edges of a tire carcass in the assembly of a tire on the core, which grasping means is movable toward and away from the core independently of both drum parts, each drum part being telescopable over at least a part of said drum supports.

19. The tire builder of claim 18 which includes a track and roller means on each drum support which roller means are movable on the track.

20. The tire builder of claim 18 which includes means supported by the drum supports for rotating the drum parts.

21. The tire builder of claim 18 in which the drum parts are movably supported on drum supports, and slides are a part of each drum support and the drum parts are slidable thereover, and there is a cylinder with a piston in each slide, and a cable attached to the piston with the ends of the cable attached to the drum part.

22. In a tire builder which comprises two drum supports and two drum parts movable toward and away from a core for shaping tires located between them, the improvement which comprises non-rotatable means for grasping both edges of a tire carcass in the assembly of a tire on the core, which grasping means is movable independently of both drum parts, and means on each drum support for reciprocally moving its drum part.

23. The tire builder of claim 22 in which there is a slide which comprises a slide portion relatively movable over the surface of a body portion, the body portion being hollow and forming a cylinder, a piston movably located therein, and flexible pull means fastened to the piston with its ends attached to the slide portion.

24. The tire builder of claim 22 in which there is a tire-holding chuck which includes two side portions and the core is a flexible, inflatable bladder with its edges attached to the respective portions, and outside of each of said portions an expansible and contractable segmented bead ring, said bead rings when expanded being of larger diameter than the edges of the bladder.

25. The tire builder of claim 24 in which the parts of the side portions to which the bladder is fastened are movable toward and away from one another.

26. The tire builder of claim 24 in which the segments of the bead rings are mounted on racks with pinions on the side portions for expanding and contracting the bead rings.

27. The tire builder of claim 26 in which the pinions mesh with gear means rotatably mounted separately from said side portions, and the chuck comprises a cylinder mounted on a side portion with a piston in the cylinder which is attached to said gear means away from its center so as to turn the gear means and thus effect expansion and contraction of the bead rings.

28. The tire builder of claim 24 which includes between two parts of the tire builder a tire-holding chuck, with one side of the chuck permanently attached to one of said parts and the other side attached to the other part by a separable support.

29. In a tire builder which comprises two drum parts each supported by a separate drum support and between said drum parts a core for shaping a tire, the improvement in which the core is at least partially supported by one drum support, the drum parts and the core are rotatable, means for rotating the drum parts at the same surface speed, and means on each side of the core for shaping a tire on the core which last-mentioned means are not rotatable.

30. The tire builder of claim 29 in which the core is permanently supported by only one drum support, the core is slidably keyed to the drum part on said drum support, and the means for laterally moving the drum parts and the core includes a jack shaft with means for rotating the same.

31. The tire builder of claim 22 in which there are two adjacent manifolds, at least one of the manifolds being rotatable and fastened to a drum support, mating grooves at the interface between the manifolds, which mated grooves form non-connecting conduits, and a separate pipe connecting with each groove in each of the manifolds.

32. The tire builder of claim 31 in which the manifolds are located one within the other.

33. The tire builder of claim 32 which includes a non-rotable drum support and a core over which a carcass band is shapable, a rotatable quill passing through the drum support out of contact therewith, the core being supported at one end of the quill and rotatable therewith, the other end of the quill constituting the rotatable manifold, fluid lines connected with the rotatable manifold and contained within the quill and connected with means at the core for operating the same, and the stationary manifold being supported by non-rotatable means on the opposite side of the drum support from the core.

34. In a tire builder which comprises a flexible, inflatable bladder and two rotatable drum parts movable toward and away from the bladder and support means for the drum parts, the improvement which comprises non-rotatable means for grasping the respective edges of a carcass band formed on the drum parts, said means being movable toward and away from the bladder.

35. The tire builder of claim 34 in which an idler roller is hingedly attached to said means for grasping a band and is movable toward and away from a position extending inwardly from the grasping means thereon, to support the edges of a carcass band when extended after retraction of the drum parts from supporting the band.

36. The tire builder of claim 24 in which a gap-closure is positioned between each two bead-ring segments, which gap closer is within the outline of the side portions of the chuck so that it does not protrude inwardly therefrom and is slidable with respect to at least one of the segments so that it slides with respect to said segment when the bead ring is expanded and prevents the edges of the bladder from being pinched between the segments when the expanded bead ring is returned to its unexpanded position.

37. The tire builder of claim 36 in which each gap-closer is fastened at one end to one of two adjacent segments near an edge thereof, and there is a projection from the adjacent segment near an edge thereof, and a slot in the gap-closer straddles said projection as the segments are moved toward and away from the axis of the chuck.

38. In the tire builder of claim 22 in which the reciprocable means includes a fluid-powered load-carrying slide which comprises two parts which are engaged with one another, with one part movable with respect to the other, a fluid cylinder within the first part having its piston connected to the second part to effect relative movement of one part with respect to the other.

39. In the tire builder of claim 38 a slide in which one part is stationary.

40. In the tire builder of claim 38 a slide in which a load is fastened to one part to be moved thereby.

41. In the tire builder of claim 38 a slide in which one part is slidably dove-tailed in the other.

42. In the tire builder of claim 38 a slide in which guide rollers are fastened to one part in spaced relation, and the piston is connected to the second part by a cable threaded over the guide rollers.

43. In the tire builder of claim 38 a slide in which there are only two guide rollers and they are located at the ends of the cylinders and the entire cable lies in one plane.

44. In a tire builder which comprises a flexible, inflatable bladder and support means therefor and two drum parts of the same outside diameter with means for separately supporting the same and means for moving them toward and away from the bladder parallel to its axis, with the inner edges of said drum parts touching said bladder near its portion of greatest diameter when said parts are positioned closest to one another, the improvement which comprises a support with means projecting therefrom for grasping the edge of a carcass band and bead-supporting means extending longitudinally from said projecting means.

45. In a tire builder which comprises a flexible, inflatable bladder and support means therefor and two drum parts of the same outside diameter with means for separately supporting the same and means for moving them toward and away from the bladder parallel to its axis, with the inner edges of said drum parts touching said bladder near its portion of greatest diameter when said parts are positioned closest to one another, the improvement which comprises two adjacent manifolds, one being rotatable and the other fastened to a drum support, mating grooves at the interface between the manifolds, which mating grooves form non-connecting conduits, and a separate pipe connecting with each groove in each of the manifolds.

46. In a tire builder which comprises a bladder and support means therefor and two drum parts of the same outside diameter with means for separately supporting the same and means for moving them toward and away from the bladder parallel to its axis, with the inner edges of said drum parts touching said bladder near its portion of greatest diameter when said parts are positioned closest to one another, the improvement which comprises a bead turn-up wheel on each side of the bladder supported by means projecting toward the bladder and means for resiliently pressing the turn-up wheel against material on the bladder.

References Cited

UNITED STATES PATENTS

| | | | |
|---|---|---|---|
| 3,424,634 | 1/1969 | Menell | 156—133 |
| 2,954,818 | 10/1960 | Frohlich | 156—133 X |
| 3,178,327 | 4/1965 | Beckadolph et al. | 156—133 |
| 3,506,514 | 4/1970 | D'Avello et al. | 156—416 X |
| 3,257,255 | 6/1966 | Batten | 156—132 X |

ROBERT F. BURNETT, Primary Examiner

C. B. COSBY, Assistant Examiner

U.S. Cl. X.R.

156—132, 133, 402, 403, 410, 413, 416, 418